(12) United States Patent
Lin et al.

(10) Patent No.: US 10,893,147 B2
(45) Date of Patent: *Jan. 12, 2021

(54) ROOM SENSOR APPLICATIONS AND TECHNIQUES

(71) Applicant: Intel Corporation, Santa Clara, CA (US)

(72) Inventors: Xintian E. Lin, Mountain View, CA (US); Lei Shao, Sunnyvale, CA (US); Ulun Karacaoglu, San Diego, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,445

(22) Filed: Jun. 14, 2017

(65) Prior Publication Data

US 2018/0121150 A1 May 3, 2018

Related U.S. Application Data

(63) Continuation of application No. 14/496,972, filed on Sep. 25, 2014, now Pat. No. 9,710,214.

(Continued)

(51) Int. Cl.
*H04M 3/56* (2006.01)
*H04W 8/00* (2009.01)
(Continued)

(52) U.S. Cl.
CPC .......... *H04M 3/563* (2013.01); *G06F 3/1423* (2013.01); *G06F 9/452* (2018.02); *G09G 5/12* (2013.01);
(Continued)

(58) Field of Classification Search
CPC ......... H04W 4/043; H04W 4/16; H04W 4/04; H04W 4/80; H04W 8/005; H04W 76/14;
(Continued)

(56) References Cited

U.S. PATENT DOCUMENTS 9,710,214 B2 * 7/2017 Lin ................... H04W 76/14
2008/0136973 A1 * 6/2008 Park ..................... G03B 29/00
348/744

(Continued)

OTHER PUBLICATIONS

United States Patent and Trademark Office, "Notice of Allowance," issued in connection with U.S. Appl. No. 14/496,972, dated Mar. 14, 2017, 15 pages.

(Continued)

*Primary Examiner* — Jianye Wu
(74) *Attorney, Agent, or Firm* — Hanley, Flight and Zimmerman, LLC

(57) ABSTRACT

The disclosure relates to a method, apparatus and system to provide automated audio video conferencing in a conference room. In an exemplary embodiment, the disclosure relates to a mobile device having one or more processors and circuitry. The circuitry may execute a first logic, a second logic and a third logic. The first logic may be configured to receive instructions to connect the mobile device to a wireless equipment in a conference room. The second logic may be configured to obtain conference room information. The third logic may be configured to transmit a request to pair with a wireless equipment in the conference room. The third logic may be further configured to: receive information in a first communication mode that a code challenge will be issued, receive a code challenge in the second communication mode and pair the mobile device with the wireless equipment.

31 Claims, 7 Drawing Sheets

Related U.S. Application Data

(60) Provisional application No. 61/992,514, filed on May 13, 2014.

(51) Int. Cl.

| | | |
|---|---|---|
| *H04W 12/06* | (2009.01) | |
| *G09G 5/12* | (2006.01) | |
| *G06F 3/14* | (2006.01) | |
| *H04W 76/14* | (2018.01) | |
| *G06F 9/451* | (2018.01) | |
| *H04W 4/80* | (2018.01) | |
| *H04W 4/38* | (2018.01) | |
| *H04W 4/33* | (2018.01) | |

(52) U.S. Cl.
CPC ............. *H04M 3/567* (2013.01); *H04W 4/33* (2018.02); *H04W 4/38* (2018.02); *H04W 4/80* (2018.02); *H04W 8/005* (2013.01); *H04W 12/06* (2013.01); *H04W 76/14* (2018.02); *G09G 2370/022* (2013.01); *G09G 2370/16* (2013.01); *H04M 2203/256* (2013.01); *H04M 2203/6072* (2013.01); *H04M 2207/18* (2013.01); *H04M 2242/08* (2013.01)

(58) Field of Classification Search
CPC ......... H04W 12/06; H04W 4/38; H04W 4/33; G06F 9/452; G06F 3/1423; G09G 5/12; G09G 2370/16; G09G 2370/022; H04M 2203/6072; H04M 2203/256; H04M 3/567; H04M 3/563; H04M 2207/18; H04M 2242/08

See application file for complete search history.

(56) References Cited

U.S. PATENT DOCUMENTS

| | | |
|---|---|---|
| 2010/0030788 A1 | 2/2010 | Chen et al. |
| 2012/0249741 A1 | 10/2012 | Maciocci et al. |
| 2012/0293605 A1 | 11/2012 | Seferian et al. |
| 2013/0229929 A1 | 9/2013 | Linsky |
| 2014/0064471 A1* | 3/2014 | Krishnan ............... H04M 3/567 |
| | | 379/202.01 |
| 2014/0279479 A1 | 9/2014 | Maniar et al. |
| 2015/0139044 A1* | 5/2015 | Maski ..................... H04W 4/08 |
| | | 370/261 |

OTHER PUBLICATIONS

United States Patent and Trademark Office, "Advisory Action," issued in connection with U.S. Appl. No. 14/496,972, dated Jan. 25, 2017, 3 pages.

United States Patent and Trademark Office, "Final Office action," issued in connection with U.S. Appl. No. 14/496,972, dated Sep. 23, 2016, 15 pages.

Lin et al., "Systems and Methods for Wireless Display Discovery", U.S. Appl. No. 14/128,001, filed Dec. 20, 2013, 29 Pages.

United States Patent and Trademark Office, "Non-Final Office action," issued in connection with U.S. Appl. No. 14/496,972, dated Feb. 19, 2016, 23 pages.

* cited by examiner

ROOM SENSOR APPLICATIONS AND TECHNIQUES

The instant application claims the filing date priority of U.S. patent application Ser. No. 14/496,972, filed Sep. 25, 2014 which in turn claims the filing date priority to the Provisional Patent Application No. 61/992,514, filed May 3, 2014. The instant disclosure is also a continuation-in-part of application Ser. No. 14/128,001 ("the '001 application"), filed Dec. 20, 2013. The disclosures of both Applications are incorporated herein in their entirety.

BACKGROUND

Field

The disclosure relates to a method, apparatus and system to provide automated audio video conferencing in a conference room augmented with wireless system and software.

Description of Related Art

Conventional conference room setup is difficult, tedious and complicated. Presentations and conference calls are often cumbersome to set up. The setup procedure varies for each conference room and for each device. For example, the user has to manually configure the information on a laptop, tablet or other smart devices which can be both time-consuming and error prone. Other members of the meeting must use dial-in instructions for audio connection. Conference members may have to follow a different set of instructions to join the audio/video conference.

The conventional systems are particularly difficult if the conference attendees have to share a presentation screen and present material. Therefore, there are ongoing needs for improvements in meeting room setup and automation to enhance the user experience.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
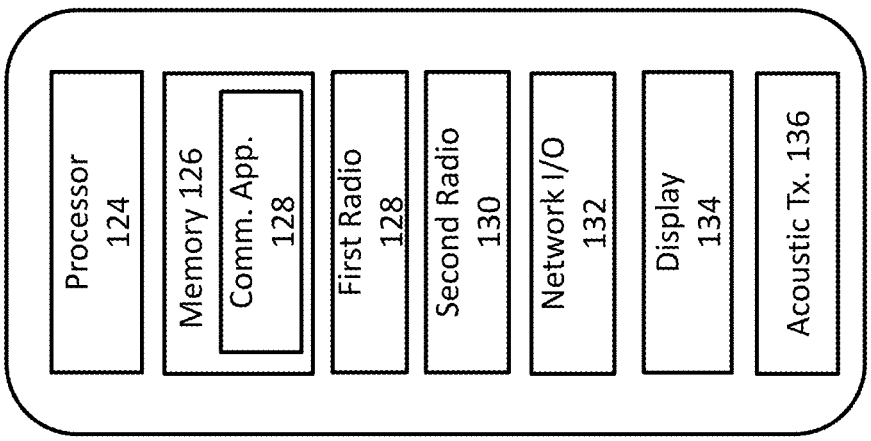
FIG. 1 is an exemplary system and environment according to an embodiment of the disclosure.
Figure 1:
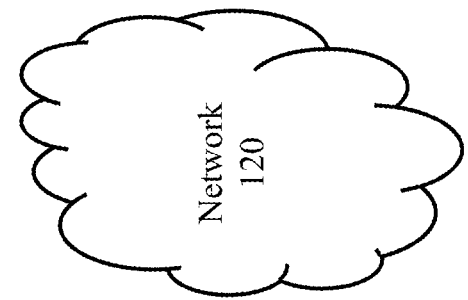
Figure 1:
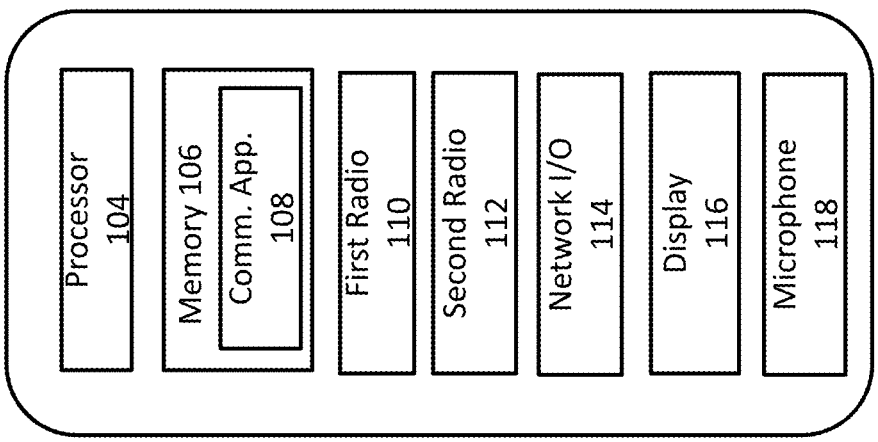

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

The conventional conference room presentations and conference calls setup procedures are tedious. The user must manually configure a variety of communication information in the laptop, tablet, smartphone or the STA. This process is time-consuming and error prone. Embodiments provided herein significantly simplify the set up procedure for a conference room environment. The disclosed embodiments may be applied to laptops, tablet computers, smartphones and other mobile devices or other STAs. In one embodiment of the disclosure, a so-called smart room sensor and/or proximity technology is used to improve efficiency and enhance user experience.

Conventional room sensors are based on either Infrared/video cameras or microphones which provide room occupancy information to the IT hub. For example, attendees have to open their mobile devices and wirelessly scan for available services. In addition, attendees have to physically look for device IDs with appropriate labels. Each attendee must pair devices (if not paired earlier) which includes typing certain information unique to the room to authenticate attendee's presence. In situations where the identification numbers are dynamically changing, the process must be repeated for each device. To dial into the telephone conference bridge, the attendee has to manually provide the teleconference number to the conferencing software (e.g., Microsoft Lync®). Next, the presenter must manually dim room lighting and roll down a projection screen prior to a video presentation. This process is cumbersome and error prone.

An embodiment of the disclosure configures one or more of an in-room sensors or a wireless projector (or other wireless presentation equipment) to automate these and other related functions. For example, the automated process enables a conference attendee's device to automatically obtain conference room information, authenticate its presence in the conference room and dynamically pair with wireless equipment (e.g., wireless projector) after the user initiates the process with just one click. The automated system enables automatic or dynamic connection to conference room equipment including a wireless projector, single click (interchangeably, one click) dial into phone bridge with applicable software, optional light control for video presentation, optional pairing with other attendees' devices and updating the conference room occupancy status. The disclosed embodiments obviate the steps of discovering, pairing, connecting and controlling multiple systems and devices that are conventionally done manually.

FIG. 1 is an exemplary system and environment according to an embodiment of the disclosure. Specifically, FIG. 1 shows environment 100 having user devices 102 and wireless sensor 122. User devices may include computers, tablets, smartphones or any other device configured for wireless communication. A wireless sensor may be integrated with a wireless projector, a conference room wireless lighting system or any other conference room device. In one embodiment, the wireless sensor may be integrated with a room sensor or a hub for managing the conference room automation. Wireless sensor 122 may be configured to integrate or communicate with user device 102 in the conference room or other peripheral services (e.g., printer, phone system, other users, etc.)

System 100 may also be used for wireless discovery and pairing of the wireless device with the appropriate conference room. The '001 application, which is incorporated herein in its entirety, discloses exemplary embodiments for user device 102 discovering the conference room it is attending. While system 100 is shown with user device 102, the disclosure is not limited thereto and multiple user devices may simultaneously engage network 120 to communicate with wireless sensor 122. User device 102 may include one or more computer processors 104, memory circuitry 106 which may store a communication application (interchangeably, communication software) 108, first radio transceiver 110, second radio transceiver 112, network and input/output (I/O) interfaces 114, display 116 and optional microphone 118.

As stated, wireless sensor 122 may be integrated with a projector to form a wireless projector configured to wirelessly communicate with user device 102. The wireless sensor may additionally communicate with and/or control one or more display devices in the conference room. Wireless sensor 122 may include communication application 128, residing in memory 126. Communication application may comprise logic modules to identify user device 102, and upon receiving the user's single click, to initiate communication with the user device and to authenticate the user device so as to provide seamless presentation in the conference room. Wireless sensor 122 may additionally include one or more processors 124, memory 126, first radio transceiver 128, second radio transceiver 130, network and input/output (I/O) interfaces 132, display 134 and acoustic transceiver 136.

Each of user device 102 and wireless sensor 122 may include a proximity detector. In an exemplary embodiment, second radio 112 of user device 102 may communicate with second radio 130 of sensor 122 to detect whether they are in the same room. If wireless sensor 122 is determined to be in the same room as user device 102, then first radio 110 of the user device 102 may communicate with first radio 128 of wireless sensor 122 to establish a streaming wireless display connection. It should be noted that all radio transceivers described with respect to user device 102 and wireless sensor 122 may be configured to receive and/or transmit any type of radio signals (e.g., Wi-Fi, BT/BLE, Cellular, etc.) While not shown, user device 102 and wireless sensor 122 may also include apparatus, system and software for infrared signaling. Acoustic transceiver 136 of wireless sensor 122 may emit sound signals which are received by microphone 118 of user device 102.

Processors 104/124 may comprise one or more processor cores and may be configured to access and execute (at least in part) computer-readable instructions stored in the memory 106/126, respectively. Processors 104/124 may also include a central processing unit (CPU), a digital signal processor (DSP), a reduced instruction set computer (RISC), a complex instruction set computer (CISC), a microprocessor, a microcontroller, a field programmable gate array (FPGA), or any combination thereof. User device 102 may also include a chipset (not shown) for controlling communications between processors 104/124 and other components of user device 102.

Memory circuitries 106/126 may comprise one or more computer-readable storage media (CRSM). In some embodiments, the memory 106/126 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/126 may store an operating system that includes a plurality of computer-executable instructions that may be implemented by the processors 104/124 to perform a variety of tasks to operate the interface(s) and any other hardware installed on user device 102. Memory circuitries 106/126 may also store content that may be displayed by user device 102 or transferred to other devices (e.g., headphones) to be displayed or played by the other devices. Memory circuitries 106/126 may store content received from other devices. The content from the other devices may be displayed, played, or used by user device 102 to perform necessary tasks or operations that may be implemented by computer processors 104/124 or other components in devices 102/122.

The network and I/O interfaces 114/134 may comprise one or more communication interfaces or network interface devices to provide for data transfer between the user device 102 and another device (e.g., network server) via an auxiliary network (not shown). The communication interfaces may include PANs, LANs, WLANs, wireless wide area networks (WWANs). User device 102 may be coupled to the network via a landline connection. Wireless system interfaces may also include the hardware and software to broadcast and receive messages wirelessly through network 120.

In one embodiment of the disclosure, the communication interfaces may use acoustic, radio frequency, optical, or other signals to exchange data between user device 102, wireless sensor 122 and other device such as an AP, a host computer, a server, a router, a reader device or a printer. Network 120 may include Internet, a private network, a virtual private network, a wireless WAN, a LAN, a metropolitan area network or a telephone network.

Display 116/134 may include any conventional display medium. The display may be used to show content to a user in the form of text, images or video. In certain embodiments, the display may also operate as a touch screen display to enable user communication.

System 100 allows user device 102 to automatically establish a wireless display connection with a wireless sensor 122 when the user is detected in the conference room. In another embodiment, user device 102 may detect presence of multiple wireless display devices in the conference room. Therefore, according to embodiments described herein, systems and methods are provided to facilitate identification of each of the discovered devices in the room. The '001 application, which is incorporated herein in its entirety, provides exemplary systems and method for wireless sensor discovery and pairing.

In one embodiment, wireless sensor 122 may be configured to periodically advertise and/or broadcast identification information to other wireless devices in the room (i.e., user device 102). User device 102 may receive an indication from the user (not shown) to search and/or otherwise detect the presence of wireless display devices or wireless sensor 122. Communication application 128 may be configured to detect presence of user device 102 in the conference room, authenticate the user device and pair user device 102 to a conference room device (e.g., wireless projector).

In another exemplary embodiment, user device 102 may initiate a command to detect presence of wireless sensor 122. Communication application 108 of user device 102 may be configured to detect one or more wireless sensors 122 via first or second radio 112. In certain embodiments, second radio 112 may be a BT or BLE transceiver configured for short-range detection. In certain other embodiments, the second radio 112 may be associated with other communication modes. In one embodiment, user device 102 may detect presence of multiple wireless sensors 122. Each wireless sensor may be associated with a different conference room device or service.

In one embodiment, communication application 108 or 128 may be configured to determine respective received signal strength indications (RSSIs) associated with other wireless devices. The communication application may then identify the device associated with RSSI and communicate with the device only if the RSSI is above a predetermined threshold. Thus, user device 102 may estimate whether wireless sensor 122 is in the same or an adjacent conference room. Conversely, communication application 128 of wireless sensor 122 may determine based on a weak RSSI, that user device 102 is not in the conference room being serviced. Communication applications 108/128 may be configured to transmit respective connection requests (e.g., via the second radio 112/130) to one or more identified wireless devices. Responsive to the connection request, the identified wireless devices may transmit a connection response to the initial device pairing request.

In some implementations, the connection response may include wireless address identifiers and inaudible audio signal identifiers. For example, an identified wireless projector may be associated with a wireless address identifier and an inaudible audio signal identifier. The inaudible audio signaling may comprise ultrasound signaling. If there are multiple wireless projectors, each may be configured to transmit a unique wireless address identifier and inaudible audio signal identifier to user device 102. According to some embodiments, a wireless address identifier may include a Wi-Fi Media Access Control (MAC) address.

Communication application 108 may be further configured to transmit instructions (e.g., via the second radio transceiver 112) to wireless sensor 122 to send/emit inaudible audio signals. In response, the wireless sensor 122 may be configured to send/emit (e.g., via their respective acoustic emitters 136) inaudible audio signals to user device 102. According to certain embodiments, the inaudible audio signals may be ultrasound audio signals associated with a frequency of 20 KHz or above. Upon transmission, microphone 118 of user device 102 may receive the inaudible audio signals. Each inaudible audio signal may include respective signature information to correspond to a unique device.

Figure 2:
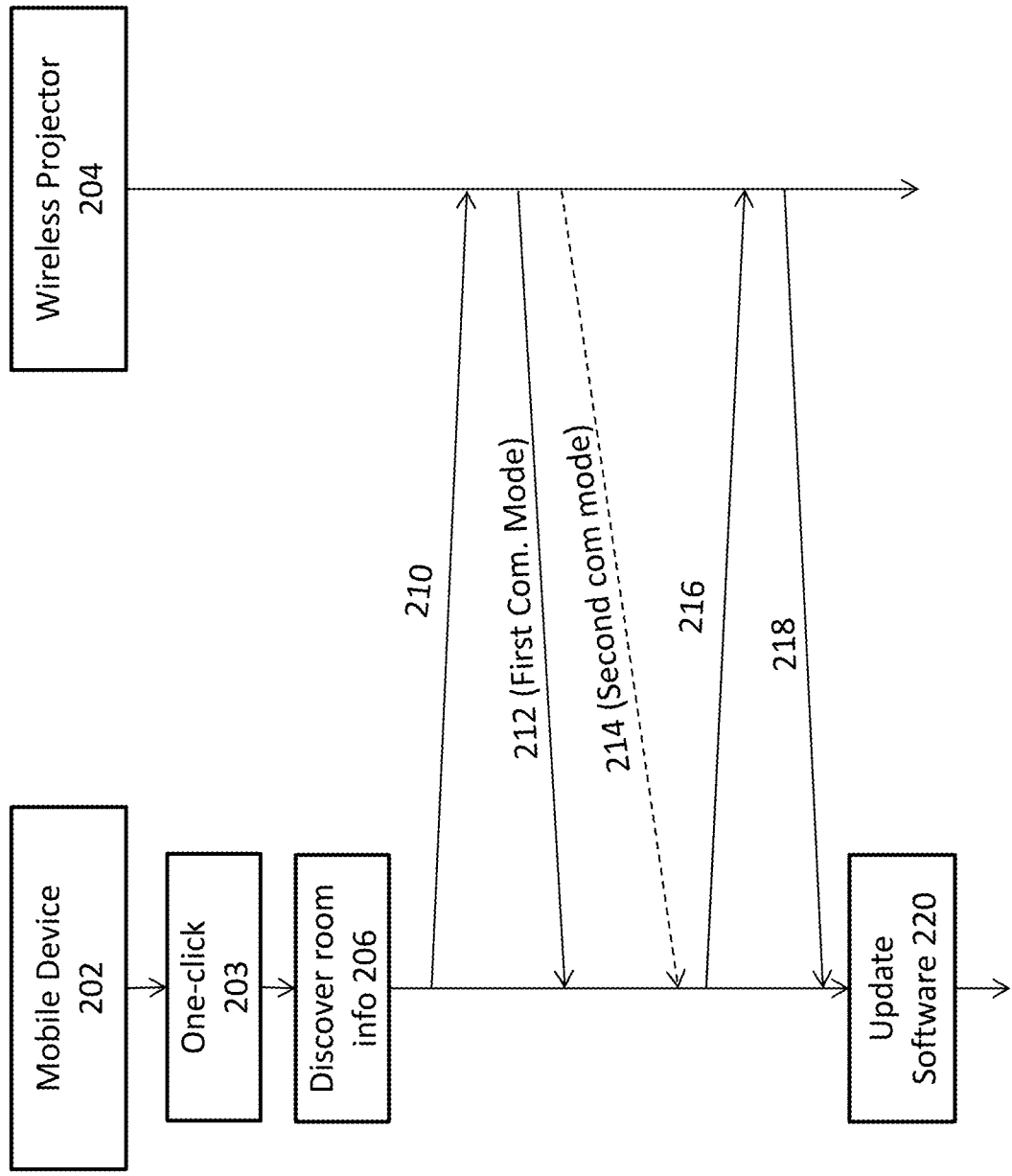
FIG. 2 is an exemplary process for paring a user device to a wireless projector in a conference room according to one embodiment of the disclosure.

FIG. 2 is an exemplary process for paring a user device to a wireless projector in a conference room. In FIG. 2, the vertical lines schematically represent the process timeline. While the pairing process is shown between device 202 and wireless projector 204, the disclosed embodiments are not limited thereto. For example, a conference room wireless sensor may be used in place of wireless projector 204. In another exemplary embodiment, wireless pairing may be done with both wireless projector 204 and a room sensor (not shown).

At step 203, the user initiates device detection through mobile device 202. Detection may be initiated when the user opens the communication software residing on the mobile device. The process may be initiated with one-click on an application on the mobile device. Once initiated, mobile device 202 seeks to connect to wireless projector 204. Step 203 may include proximity detection between user device 202 and wireless projector 204. Step 206 enables mobile device to detect which room the device is located after communicating (e.g., through BLE/each ultrasound) with one or more room sensors. The room sensors may be in different rooms. A room sensor may reside inside the wireless projector or at a wireless sensor hub.

At step 206, device 202 discovers room information. Room discovery can be implemented according to the exemplary embodiments of the '001 application, which is incorporated herein in its entirety. Step 206 may be implemented at a wireless environment similar to that shown at FIG. 1. By way of example, device 202 may receive BT/BLE advertisement from several nearby conference rooms and through an authentication process determine which conference room it is attending. The authentication process may include BT/BLE as well as infrared or ultrasound signaling. The process of step 206 may be implemented through a wireless room sensor. Once authenticated, device 202 discovers room information, including conference telephone number for the room as well as other information pertaining to the room. Additional information may include the room location or room number, the MAC address of the wireless projector or the specific sequence number related to ultrasound verification.

Once room information is obtained (step 206), the user devices may also be provided with wireless projector ID. User device 202 and wireless projector 204 may be paired by the process shown in steps 210-218 for first time pairing. At step 210, device 202 sends a pairing request to wireless projector 204. To authenticate the presence of device 202 in the conference room, wireless projector 204 may issue a so-called code challenge. The code challenge process can be used to prevent non-attending devices from taking control of wireless projector 204 or other conference room equipment. The code challenge is also effective at preventing presentation in an unintended adjacent conference room. An exemplary code challenge according to one embodiment of the disclosure includes using different communication modes to confirm and authenticate presence of mobile device 202 in the same conference room as wireless projector 204.

At step 212, wireless projector 204 sends a code challenge to mobile device 202. The code challenge may be in the first communication mode (e.g., BT/BLE) and contain information that indicate an authorization code will be forthcoming in a second communication mode (e.g., ultrasound or infrared). At step 214, wireless projector 204 sends mobile device 202 the code portion of the code challenge in a second communication mode. The ultrasound code may be received by the wireless device's microphone (not shown). The ultrasound code will be received by device 202 if the device is present in the conference room. The ultrasound challenge process of FIG. 2 gives wireless projector 204 reliable indication that device 202 is present in the room. An impostor outside the room cannot pass the ultrasound challenge test. At step 216, device 202 responds to wireless projector 204 by authenticating the code. Device 202 may respond to the ultrasound challenge with a signal in the first or second communication modes.

Authentication is not limited to ultrasound. Device 202 may transmit a BT/BLE, Wi-Fi, cellular, infrared or other signals to confirm information contained in the ultrasound code. Once the authentication code is received and verified, at step 218, device 202 and wireless projector 204 are paired. It should be noted that authentication may proceed using different wireless signals. For example, instead of ultrasound, authentication may be performed using a BT/BLE signal while the remaining communication signals are exchanged through Wi-Fi or cellular signals. In another embodiment, infrared signaling may be used as a communication mode such that infrared signal may be issued by wireless projector 204 and detected by an infrared light sensor associated with device 202. Infrared light, similar to ultrasound, will not penetrate a wall and will not engage wireless devices outside the conference room.

At optional step 220, the room information and any additional information obtained from wireless projector 204 may be used to update conference software (not shown). Step 220 may be implemented right after step 206 and need not necessarily occur after the pairing process. As stated, the conference software may comprise any conventional software application configured for multiple user audio and video communication. An exemplary communication software is Microsoft Lync® by Microsoft Corporation of Redmond Wash. Once mobile device 202 obtains the room information, its communication application may be updated with the conference room telephone number in its call menu. As stated, a proximity detector may detect the user device and initiate communication. The user may select the appropriate communication software to open the dialog box.

Figure 3:
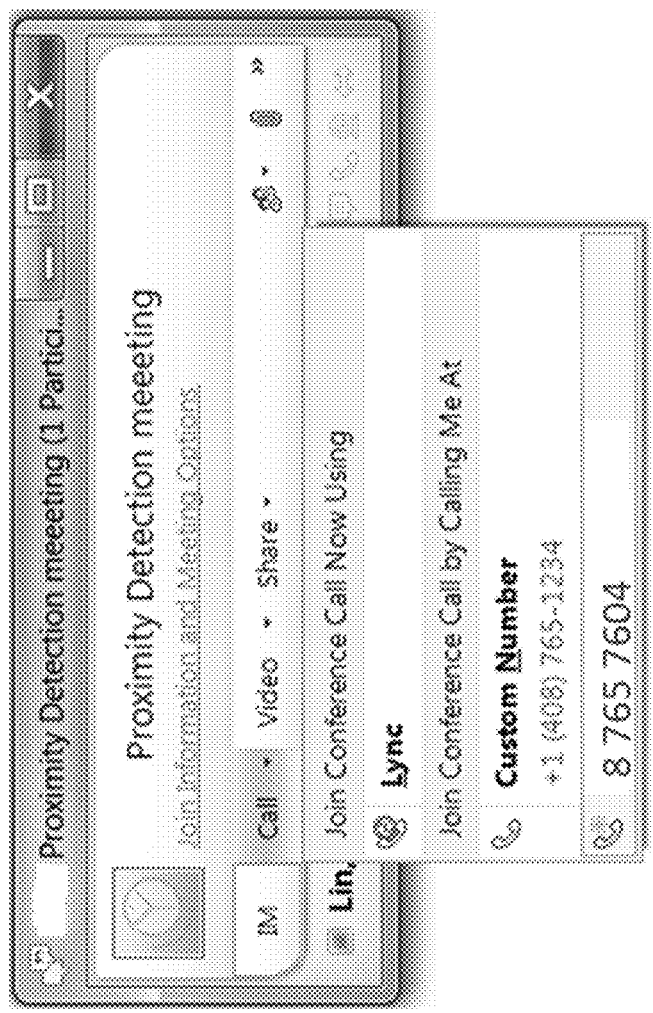
FIG. 3 illustrates a screenshot of proximity detection meeting and call information updated in an exemplary conference application.

FIG. 3 illustrates a screenshot of proximity detection meeting and call information updated in an exemplary communication software. The dialog box shown at FIG. 3 my open after step 203 on the user's device. In FIG. 3, the conference room number 8-765-7604 is inserted in the call menu by the proximity detection page of the conference software. As stated in relation to the exemplary embodiment of FIG. 2, the conference room information (e.g., conference telephone numbers) may be discovered from room information. This feature enables a seamless, single-click, process to join the conference call.

With the room information on user device (e.g., laptop, tablet, smartphone or STA), the device may configure itself with a proximity filter and pair with, or control, the conference room equipment. The user device may also provide information to a communication hub (IT hub) to update the conference room occupation information. The communication hub may include one or more servers configured to schedule conference room availability and scheduling.

Figure 4:
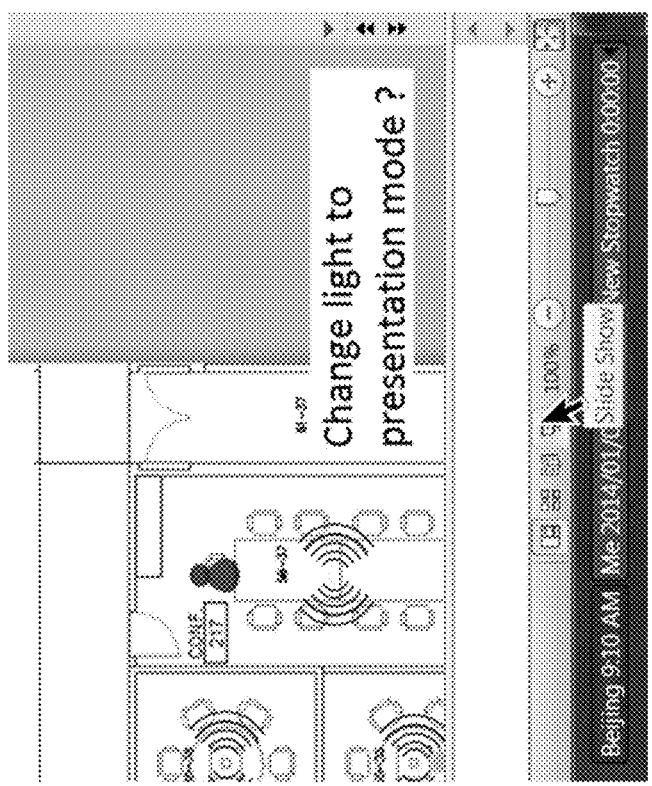
FIG. 4 is a screenshot of an exemplary application according to one embodiment of the disclosure for automated dimming of conference room light during a presentation.

FIG. 4 is a screenshot of an exemplary application according to one embodiment of the disclosure for automated dimming of conference room light during a presentation. Once pairing between the user's mobile device and a wireless projector has been established (e.g., FIG. 2), the wireless projector may be configured to automatically dim the conference room lights based on the user's action. For example, FIG. 4 shows the presenter's screen shot. In one embodiment, the slideshow button may be linked to the conference room's light control system. Thus, when the presenter gives indication that a video presentation is about to begin (e.g., by placing curser on the slide show button as shown on FIG. 4), the software application may display an option to dim the lights in the conference room. The optional light control can be enabled upon entering or ending the slide or video modes.

Figure 5:
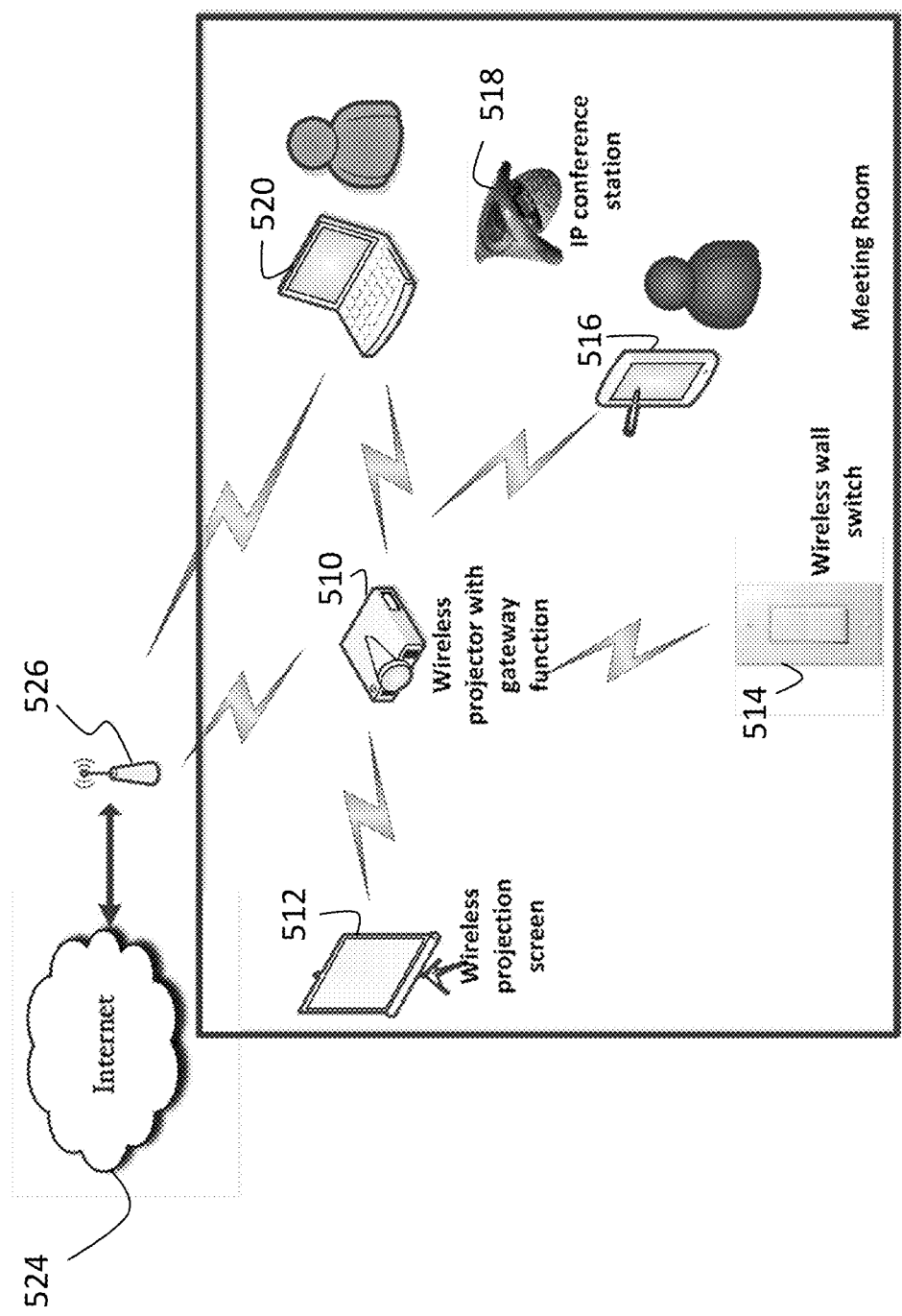
FIG. 5 is an exemplary representation of an environment according to one embodiment of the disclosure.

FIG. 5 is an exemplary representation of an environment according to one embodiment of the disclosure. In FIG. 5, wireless projector 510 acts as both the projector and the wireless gateway (or wireless sensor) to the conference room such that a separate conference room hub is not needed. Wireless projector 510 may communicate with internet 524 through AP 526.

In one embodiment, the user initiates the in-room detection and pairing to wireless projector 510 with just one click. User device 516 may also discover room information as discussed above. Conference room devices may include wireless projection screen 512, computer 520, telephone conference station 518, user tablet 516 and wireless wall switch 514. The user may manually initiate connection to projector (which may trigger pairing process). Once pairing and room information is provided to the host user's device (e.g., table 516), the following exemplary actions may be performed:

First, device 516 may be updated such that only devices in the room are displayed for possible pairing. In one implementation only one pairing is needed for all the resources in the room. Room sensor in a conference room may only have access to the display devices present in the same room. The room sensor may limit the display to devices that have correct room information (e.g., Room No. RNB604) in the description (e.g., Projector RNB604).

Second, the in-room information may be further used by a conferencing software application to automatically update the room information through an enterprise communications application. The telephone number of the conference room may also be updated directly to the communications application so that users do not need to manually enter the conference room telephone number in the communication application. Attendees may use the communications application to directly telephone the designated conference room with a single click.

In one embodiment of the disclosure, the option to update conference room information may come up on mobile device 516 after detecting wireless projector 510. The user may select the option to connect to wireless projector 510 and then dial into the bridge with one click using, for example, the communication application. If user enters the slide show mode, mobile device 516 may popup a dialog box to ask whether to dim the lights and/or roll down the projection screen. If the user responds negatively, then no additional action is required from wireless wall switch 514 or projection screen 512. If the user responds affirmatively, then wireless wall switch 514 may take necessary steps to dim the lights. The wireless projection screen 512 may also be rolled down. When the user leaves the slide show mode, the dialog box on mobile device 516 may ask whether to turn the lights back on and/or to roll up projection screen 512 to complete the presentation.

Figure 6:
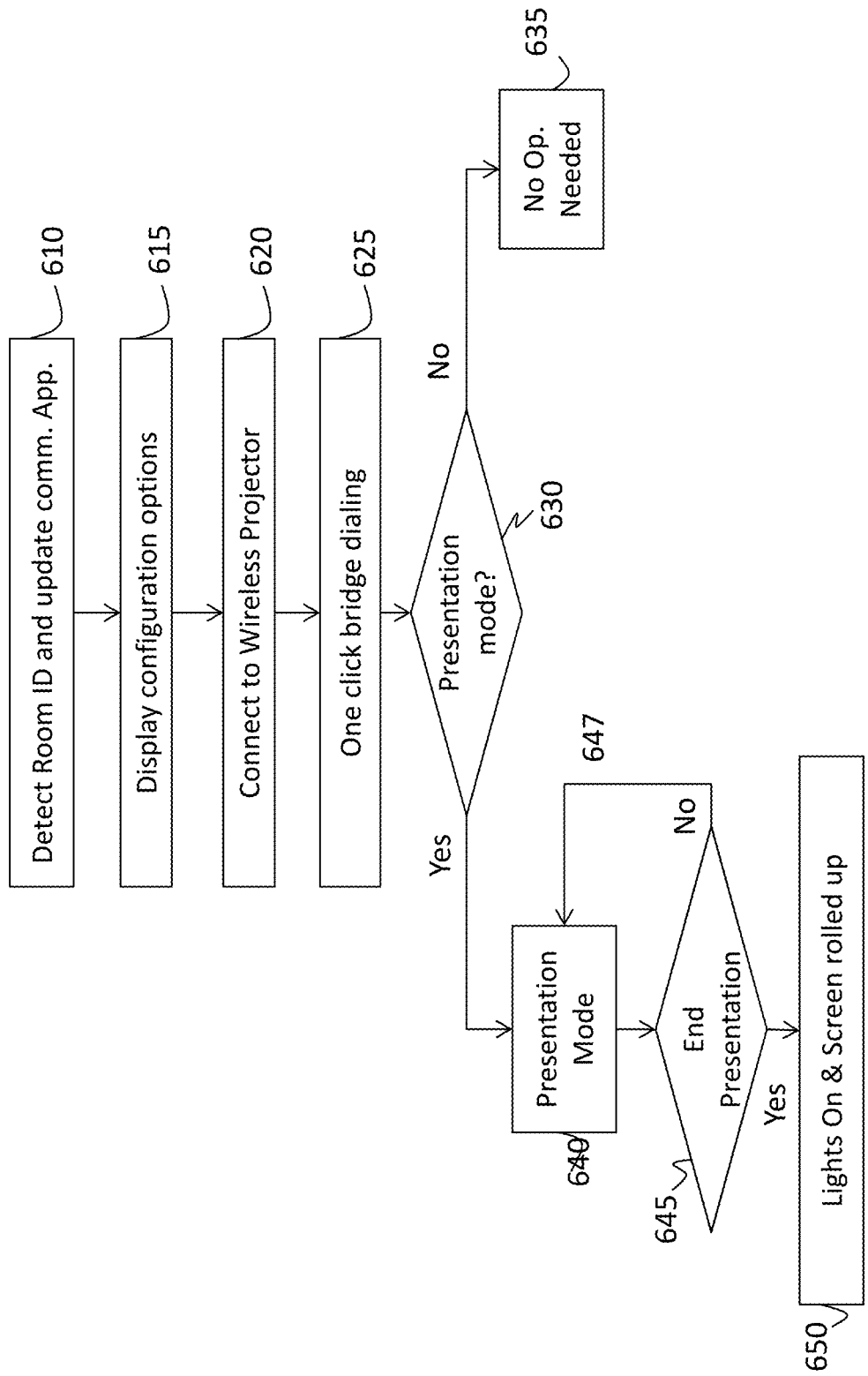
FIG. 6 is an exemplary flow diagram for implementing an embodiment of the disclosure.

FIG. 6 is an exemplary flow diagram for implementing an embodiment of the disclosure. The steps of FIG. 6 may be implemented in a wireless conferencing environment similar to that shown in FIGS. 1 and 5. The wireless conferencing environment may include wireless projection screen, wireless projector, wireless computers and/or tablets, smartphone, telephone conference stations, wireless-actuated light switches and one or more sensor hubs. As shown in FIG. 6, implementation 600 may include an antenna module 602, a transceiver module 604, and a host module 606. These elements may be implemented in hardware, software or any combination thereof.

The process of FIG. 6 starts at step 610 where a conference attendee (e.g., presenter) initiates the one-click process for in room detection and for accessing room resources. The room sensor and the user's display device (e.g., tablet 516, FIG. 5) may then initiate the pairing process. Through the pairing process, the user's device may detect room information including location, conference telephone number and availability of other wireless devices. Step 610 may optionally include updating the communication system to reflect the room information. For example, the communication system may be automatically revised to indicate occupancy of the room and update teleconferencing information.

At step 615, a dialog box pops up on the user's display device to display configuration options. The options may be configured to include a number of conference related questions. An option may be to aid with conference room environment configuration such as entering presentation mode or dimming the conference room lights.

One of the options may be asking the user whether to connect to a wireless projector (512, FIG. 5) inside the conference room. This option is displayed as step 620 and if the user is the presenter, the user's device can be connected to the wireless projector. At step 625, the user dials into the conference room bridge. In one embodiment, the user dials into the bridge using the one-click option from the corporate communication software. As discussed, the corporate communication application may be updated at the time of device pairing (step 610). The credentials of the user's device may be used to verify identity of the user. For example, if the device serial number or other identification means match existing records, then the pairing process may allow the user's device to access conferencing menu and update corporate communication software as needed. The one-click dialing allows the conference room host to press a link on the mobile device to thereby dial and sign into the conference room bridge. This obviates the need to physically dial numbers into the conference room telephone and then verify user identity by using conference leader identification number or other verification means.

At step 630, the user is given the option of starting the slide show mode by displaying a pop-up dialog window requesting user's input. The pop-up dialog window may ask the user whether to dim the conference room lights and/or to roll down the wireless projection screen. If the user does not require presentation mode, the appropriate selection can be made at step 635. This option may be selected if the conference is an audio conference. If the user elects to present video information, the appropriate selection may be made, and at step 640, the room is configured for presentation mode. The presentation mode may include dimming the lights and rolling down a presentation screen.

At step 645, the user's video presentation may come to an end and the user may respond to an inquiry to this effect. If the presentation is ended, then at step 650, the wireless projector may be turned off, the screen rolled up and the lights turned back on again. If the presentation is not ended, then the presentation mode continues as shown by arrow 647.

Figure 7:
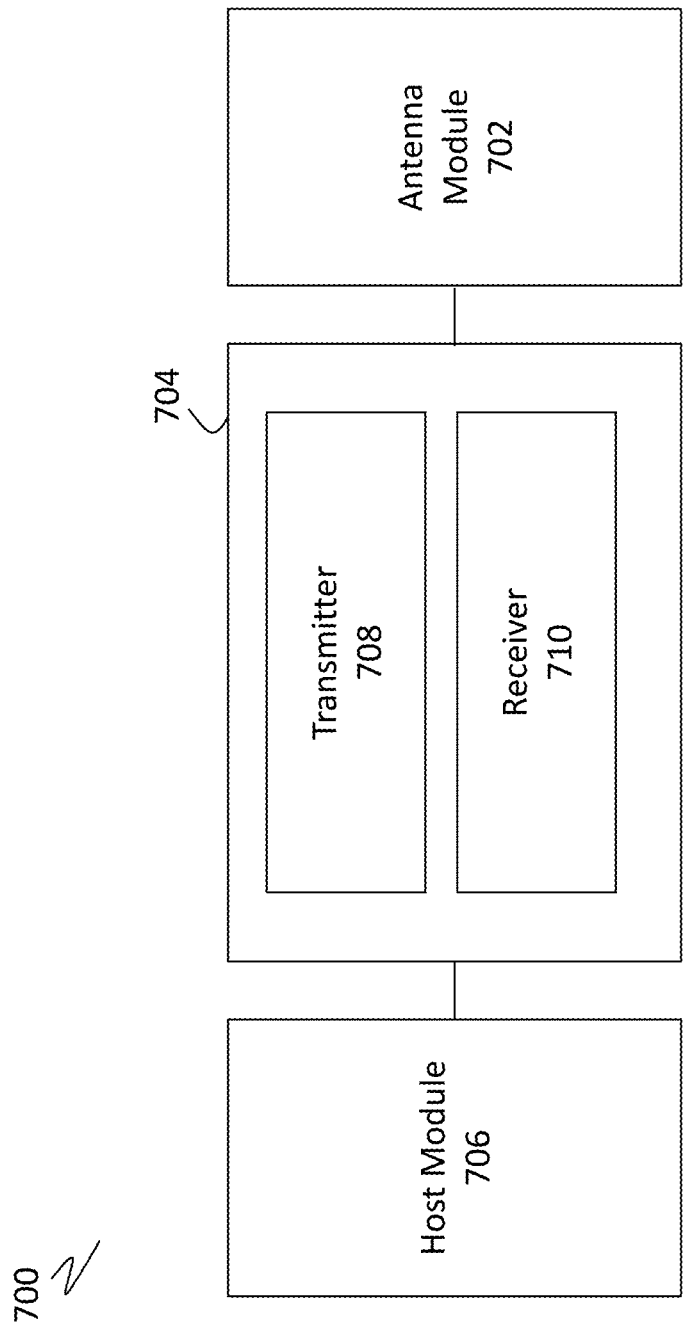
FIG. 7 schematically shows an exemplary device according to one embodiment of the disclosure.

FIG. 7 schematically shows an exemplary device according to one embodiment of the disclosure. Device 700 of FIG. 7 includes host module 706, transmitter 708, receiver 710 and antenna module 702. Antenna module 702 enables exchange of wireless signals with remote devices. Antenna module 702 may transmit wireless signals through one or more directional radiation patterns. Thus, antenna module 702 may include multiple antennas and/or multiple radiating elements (e.g., phased-array radiating elements).

Transceiver module 704 provides an interface between antenna module 702 and host module 706. Transceiver module 704 may include transmitter circuitry 708 and receiver circuitry 710. Each of transmitter and receiver circuitries may be configured to receive one or more signals. Transmitter circuitry 708 within transceiver module 704 receives symbols from host module 706 and generates corresponding signals for wireless transmission by antenna module 702. This may involve operations, such as modulation, amplification and filtering. Conversely, receiver circuitry 710 within transceiver module 704 obtains signals received by antenna module 702 and generates corresponding symbols. In turn, receiver portion 710 provides symbols to host module 706. This generation of symbols may involve operations, including demodulation, amplification and/or filtering.

The symbols exchanged between host module 706 and transceiver module 704 may form messages or information associated with one or more protocols and/or one or more user applications. For example, host module 706 may perform operations corresponding to such protocol(s) and/or user application(s) that enable wireless conferencing as discussed above. Further, exemplary protocols include various media access, network, transport and/or session layer protocols. Exemplary user applications include telephony, messaging, email and web browsing, content (e.g., video and audio) distribution/reception.

Host module 706 may exchange control information with transceiver module 704. The control information may pertain to the operation and status of transceiver module 704 including communication with the conference room sensor hub. For example, the control information may include directives that host module 706 sends to transceiver module 704 to connect to a wireless projector (or the conference room sensor hub) and to execute steps necessary to start a phone conference. Such directives may establish operating parameters/characteristics for transceiver module 704. The control information may also include data (e.g., operational status information) that host module 706 receives from transceiver module 704. It may further incorporate commands and messages that enables the techniques described in exemplary embodiments of FIGS. 1-6.

In an exemplary embodiment, host module 706 includes one or more processor circuitry to communicate with the one or more radios in transceiver 704. In one embodiment, the host module communicates with a user's wireless device. The processor circuitry may support several executable logics to implement the exemplary steps of FIGS. 2 and 6. By way of example, the processor circuitry my comprise a first logic to receive a request for pairing from a mobile device. The processor circuitry may comprise a second logic to transmit information in a first communication mode. The first communication mode may comprise a BT or BLE signal with indication that a code challenge will be transmitted through a second communication mode. The second communication mode may comprise ultrasound or infrared signaling. The antenna module 702 may be configured with a plurality of reception capabilities to accommodate BT, BLE, Wi-Fi, cellular or ultrasound signals. The antenna module may also include optical receiver circuitry to receive and process infrared signaling.

The processor circuitry may include a third logic to pair the wireless equipment with the mobile device after a successful response to the code challenge is received. The third logic may be configured to issue a response to the mobile device using one of the first or the second communication modes.

Transmitter 708 may generate signals from symbols processed by logic units of host module 706. Receiver 710 may generate symbols from signals received at antenna module 702. To provide such features, transmitter portion 708 and receiver 710 may each include various components including modulators, demodulators, amplifiers, filters, buffers, upconverters and/or downconveters. Such components may be implemented in hardware (e.g., electronics), software or any combination thereof.

The techniques described herein may be embodied in a computer-readable medium for configuring a computing system to execute the method. The computer readable media may include, for example and without limitation, any number of the following: magnetic storage media including disk and tape storage media; optical storage media such as compact disc media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following non-limiting examples further illustrate some of the inventive embodiments of the disclosure. Example 1 is directed to a tangible machine-readable non-transitory storage medium that contains instructions, which when executed by one or more processors results in performing operations comprising: receiving a request to pair a mobile device to a wireless equipment in a conference room; obtaining location information for the conference room; transmitting a request to pair with the wireless equipment; receiving information in a first communication mode that a code challenge will be transmitted through a second communication mode; receiving the code challenge in the second communication mode, the code challenge comprising authentication information; and transmitting authentication information in response to the code challenge to thereby pair the mobile device with the wireless equipment in the conference room.

Example 2 is directed to the tangible machine-readable non-transitory storage medium of example 1, wherein the first communication mode is one of Bluetooth (BT), Bluetooth Low Energy (BLE), cellular or Wi-Fi communication and wherein the second communication mode is one of ultrasound or infrared communication.

Example 3 is directed to the tangible machine-readable non-transitory storage medium of example 1, wherein the instructions to connect a mobile device to a wireless equipment further causes the one or more processors to dial a conference telephone number through a single-click execution.

Example 4 is directed to the tangible machine-readable non-transitory storage medium of example 1, wherein the instructions further cause the one or more processors to receive the first signal at the mobile device.

Example 5 is directed to the tangible machine-readable non-transitory storage medium of example 1, wherein the request to pair further causes the one or more processors to detect a wireless equipment and transmit the request to pair to the wireless equipment.

Example 6 is directed to the tangible machine-readable non-transitory storage medium of example 1, wherein the instructions further cause the one or more processors to avail a projection screen or to dim a conference room light.

Example 7 is directed to the tangible machine-readable non-transitory storage medium of example 1, wherein the instructions further cause the one or more processors to update conference room occupancy information.

Example 8 is directed to a mobile device comprising one or more processors and circuitry, the circuitry including: a first logic to receive instructions to connect the mobile device to a wireless equipment in a conference room; a second logic to obtain conference room information; a third logic to transmit a request to pair the mobile device with a wireless equipment in the conference room, the third logic further configured to: receive information in a first communication mode that a code challenge will be transmitted through a second communication mode, receive a code challenge in the second communication mode, and pair the mobile device with the wireless equipment after a successful code challenge authentication.

Example 9 is directed to the mobile device of example 8, wherein each of the first, second and third logic is initiated by a one-click execution command at the mobile device.

Example 10 is directed to the mobile device of example 8, wherein the first communication mode is one of Bluetooth (BT), Bluetooth Low Energy (BLE), cellular or Wi-Fi communication and wherein the second communication mode is one of ultrasound or infrared communication.

Example 11 is directed to the mobile device of example 8, wherein the first logic is configured to update a communication software to include a conference room telephone number.

Example 12 is directed to the mobile device of example 8, wherein the first logic is further configured to detect a proximal wireless equipment and to communicate with the second logic when the proximal wireless equipment is detected.

Example 13 is directed to the mobile device of example 8, wherein the third logic is further configured to avail a projection screen or to dim a conference room light prior to the video conference.

Example 14 is directed to a wireless equipment in a conference room, comprising: one or more antennas; one or more radios to communicate with the one or more antennas; and one or more processors and circuitry to communicate with the one or more radios, the circuitry configured to execute: a first logic to receive a request for pairing from a mobile device; a second logic to transmit information in a first communication mode that a code challenge will be transmitted through a second communication mode; and a third logic to pair the wireless equipment with the mobile device after a successful response to the code challenge issued in the second communication mode is received.

Example 15 is directed to the wireless equipment of example 14, wherein the first communication mode is one of Bluetooth (BT), Bluetooth Low Energy (BLE), cellular or Wi-Fi communication and wherein the second communication mode is one of ultrasound or infrared communication.

Example 16 is directed to the wireless equipment of example 14, wherein the first logic is configured to update a communication software to include a conference room telephone number.

Example 17 is directed to the wireless equipment of example 14, wherein the first logic is further configured to detect a proximal mobile device and to communicate with the second logic when the proximal mobile device is detected.

Example 18 is directed to the wireless equipment of example 14, wherein the third logic is further configured to avail a projection screen or to dim a conference room light prior to the video conference.

Example 19 is directed to the wireless equipment of example 14, wherein the one or more antennas further comprise a first antenna to receive a BT or a BLE signal and a second antenna to receive a cellular or a Wi-Fi signal.

Example 20 is directed to the wireless equipment of example 14, further comprising an optical receiver configured to receive an optical signal and a microphone to receive an ultrasound signal.

Example 21 is directed to the wireless equipment of example 14, wherein at least one of the one or more radios is configured to receive and process an ultrasound signal.

While the principles of the disclosure have been illustrated in relation to the exemplary embodiments shown herein, the principles of the disclosure are not limited thereto and include any modification, variation or permutation thereof.

What is claimed is:
1. A video conference device comprising:
at least one processor;
memory to store instructions; and
a communication interface to transmit from and receive signals for the processor,
the at least one processor to execute the instructions to at least:
in a first communication mode, transmit, via the communication interface, a code and an address of the video conference device in a first ultrasound message;
establish, via the communication interface, a Wi-Fi connection with a mobile device in a second communication mode based on the address from the first ultrasound message;

in the second communication mode, pair the video conference device with the mobile device based on authentication of the code when the mobile device is in proximity to the video conference device;
in the second communication mode, enable control of operation of the video conference device by the mobile device via the Wi-Fi connection while the mobile device is in proximity to and paired with the video conference device; and
after an end of the pairing, return to the first communication mode to transmit, via the communication interface, the code and the address of the video conference device in a second ultrasound message.

2. The video conference device of claim 1, wherein the communication interface includes an ultrasound transmitter.

3. The video conference device of claim 1, wherein the communication interface includes a Wi-Fi transceiver.

4. The video conference device of claim 1, wherein the video conference device is to establish a content session based on a command from the mobile device via the Wi-Fi connection.

5. The video conference device of claim 1, wherein the at least one processor is to receive commands from the mobile device via the Wi-Fi connection, the mobile device to serve as a remote control for the video conference device via the Wi-Fi connection.

6. The video conference device of claim 1, further including a wireless sensor to detect the mobile device in proximity to the video conference device, the wireless sensor to trigger the transmission of the code and the address of the video conference device in the first ultrasound message when the mobile device is detected in proximity to the video conference device.

7. The video conference device of claim 1, wherein the mobile device is in proximity to the video conference device when the mobile device is in a same room as the video conference device.

8. A wireless projector comprising:
at least one processor;
memory to store instructions; and
a communication interface to:
in a first communication mode, transmit a code and an address of the wireless projector in a first ultrasound message;
receive the code over a Wi-Fi connection established between the wireless projector and a mobile device in a second communication mode based on the address from the first ultrasound message; and
in the second communication mode, pair the wireless projector with the mobile device based on authentication of the code when the mobile device is in proximity to the wireless projector,
the at least one processor to execute the instructions to enable, in the second communication mode, control of operation of the wireless projector by the mobile device via the Wi-Fi connection while the mobile device is in proximity to and paired with the wireless projector, and after an end of the pairing, the at least one processor to execute the instructions to return to the first communication mode to transmit, via the communication interface, the code and the address of the wireless projector in a second ultrasound message.

9. The wireless projector of claim 8, wherein the communication interface includes an ultrasound transmitter.

10. The wireless projector of claim 8, wherein the communication interface includes a Wi-Fi transceiver.

11. The wireless projector of claim 8, wherein the at least one processor is to establish a content session based on a command from the mobile device via the Wi-Fi connection.

12. The wireless projector of claim 8, wherein the communication interface is to receive commands from the mobile device via the Wi-Fi connection, the mobile device to serve as a remote control for the wireless projector via the Wi-Fi connection.

13. The wireless projector of claim 8, further including a wireless sensor to detect the mobile device in proximity to the wireless projector, the wireless sensor to trigger the communication interface to transmit the code and the address of the wireless projector in the first ultrasound message when the mobile device is detected in proximity to the wireless projector.

14. At least one storage device comprising instructions that, when executed, cause a mobile device to at least:
in a first communication mode, detect a code in a first ultrasound message from a video conference device, the first ultrasound message including the code and an address of the video conference device;
establish a Wi-Fi connection with the video conference device in a second communication mode based on the address from the first ultrasound message;
in the second communication mode, pair the video conference device with the mobile device based on authentication of the code when the mobile device is in proximity to the video conference device;
in the second communication mode, control operation of the video conference device via the Wi-Fi connection while the mobile device is in proximity to and paired with the video conference device; and
after an end of the pairing, return to the first communication mode to detect the code and the address of the video conference device in a second ultrasound message.

15. The at least one storage device of claim 14, wherein the instructions, when executed, cause the mobile device to detect the code by processing a signal received via an ultrasound transceiver of the mobile device.

16. The at least one storage device of claim 14, wherein the instructions, when executed, cause the mobile device to facilitate the Wi-Fi connection via a Wi-Fi transceiver.

17. The at least one storage device of claim 14, wherein the instructions, when executed, cause the mobile device to establish a content session with the video conference device via the Wi-Fi connection.

18. The at least one storage device of claim 14, wherein the instructions, when executed, cause the mobile device to remotely control the video conference device via the Wi-Fi connection.

19. A mobile device comprising:
at least one processor;
a communication interface to transmit from and receive signals for the processor; and
at least one storage device including instructions that, when executed, cause the at least one processor to at least:
in a first communication mode, detect a code in a first ultrasound message from a video conference device, the first ultrasound message including the code and an address of the video conference device;
cause the communication interface to establish a Wi-Fi connection with the video conference device in a second communication mode based on the address from the first ultrasound message;

in the second communication mode, pair the mobile device with the video conference device based on authentication of the code when the mobile device is in proximity to the video conference device;

in the second communication mode, control operation of the video conference device via the Wi-Fi connection while the mobile device is in proximity to and paired with the video conference device; and after an end of the pairing, return to the first communication mode to detect the code and the address of the video conference device in a second ultrasound message.

20. The mobile device of claim 19, wherein the communication interface includes an ultrasound transceiver.

21. The mobile device of claim 19, wherein the communication interface includes a Wi-Fi transceiver.

22. The mobile device of claim 19, wherein the communication interface includes a microphone.

23. The mobile device of claim 19, wherein the at least one processor is to establish a content session with the video conference device via the Wi-Fi connection.

24. The mobile device of claim 19, wherein the at least one processor is to remotely control the video conference device via the Wi-Fi connection.

25. An apparatus comprising:
at least one processor;
at least one microphone to receive a first ultrasound message from a video conference device; and
at least one storage device including instructions that, when executed, cause the at least one processor to at least:
in a first communication mode, detect a code in the first ultrasound message from the video conference device, the first ultrasound message including the code and an address of the video conference device;
establish a Wi-Fi connection with the video conference device in a second communication mode based on the address from the first ultrasound message;
in the second communication mode, pair the video conference device with the apparatus based on authentication of the code when the apparatus is in proximity to the video conference device;
in the second communication mode, control operation of the video conference device with one or more transmitters over the Wi-Fi connection while the apparatus is in proximity to and paired with the video conference device; and
after an end of the pairing, return to the first communication mode to transmit the code and the address of the video conference device in a second ultrasound message.

26. The apparatus of claim 25, wherein the microphone includes an ultrasound transceiver.

27. The apparatus of claim 25, wherein the one or more transmitters include a Wi-Fi transceiver.

28. The apparatus of claim 25, wherein the at least one processor is to establish a content session with the video conference device via the Wi-Fi connection.

29. The apparatus of claim 28, wherein the at least one processor is to share content with the video conference device in the content session via the Wi-Fi connection.

30. The apparatus of claim 25, wherein the at least one processor is to remotely control the video conference device via the Wi-Fi connection.

31. An apparatus comprising:
means for detecting, in a first communication mode, a code in a first ultrasound message from a video conference device, the first ultrasound message including the code and an address of the video conference device;
means for establishing a Wi-Fi connection with the video conference device in a second communication mode based on the address from the first ultrasound message, the means for establishing to pair the video conference device with the apparatus when the apparatus is in proximity to the video conference device; and
means for controlling, in the second communication mode, operation of the video conference device wirelessly via the Wi-Fi connection while the apparatus is in proximity to and paired with the video conference device,
wherein, after an end of the pairing, the apparatus is to return to the first communication mode for the means for detecting to transmit the code and the address of the video conference device in a second ultrasound message.

* * * * *